United States Patent [19]
Mizikovsky

[11] Patent Number: 5,255,307
[45] Date of Patent: Oct. 19, 1993

[54] STATUS INDICATOR CONTROL FOR CELLULAR MOBILE TELEPHONE SYSTEM

[75] Inventor: Semyon Mizikovsky, Union, N.J.

[73] Assignee: Sony Electronics Inc., Park Ridge, N.J.

[21] Appl. No.: 879,607

[22] Filed: May 7, 1992

[51] Int. Cl.$^5$ .................. H04M 11/00; H04Q 7/00
[52] U.S. Cl. ........................ 379/58; 379/59; 379/60; 455/33.1
[58] Field of Search .............. 379/56, 58, 59, 60; 455/31.1, 33.1, 33.2, 34.1

[56] References Cited

U.S. PATENT DOCUMENTS

| 3,898,390 | 8/1975 | Wells et al. | 379/59 |
| 4,833,702 | 5/1989 | Shitara et al. | 379/60 |
| 5,020,091 | 5/1991 | Krolopp et al. | 379/58 |

FOREIGN PATENT DOCUMENTS

| 0203025 | 8/1988 | Japan | 455/33.1 |
| 0119326 | 5/1990 | Japan | 455/33.1 |
| 9105429 | 4/1991 | PCT Int'l Appl. | 379/60 |

OTHER PUBLICATIONS

Billström et al, "A Public Automatic Mobile Telephone" Ericsson Review, #1, 1980.

Primary Examiner—Jin F. Ng
Assistant Examiner—William D. Cumming
Attorney, Agent, or Firm—William S. Frommer; Alvin Sinderbrand

[57] ABSTRACT

In a cellular mobile telephone system wherein a mobile station is provided with a status indicator which provides a HOME indication when the mobile station communicates with a base station in its home system and a ROAM indication when the mobile station communicates with a base station in a "visited" system, the particular indication that is provided by the mobile station is dependent upon the system identification data (SID) that is received from the base station with which the mobile station communicates. The mobile station also includes a status order control message sensor for sensing an indicator status order control message transmitted by the base station which serves to selectively activate or deactivate the status indicator at the mobile station, notwithstanding that the indicator had been activated previously by the received SID. Thus, whether the mobile station is idle or active, that is, even when voice data is communicated between the mobile station and a base station, a change in the HOME/ROAM status of the mobile station is indicated.

22 Claims, 11 Drawing Sheets

STATUS INDICATOR CONTROL FOR CELLULAR MOBILE TELEPHONE SYSTEM

BACKGROUND OF THE INVENTION

This invention relates to cellular mobile telephone systems and, more particularly, to an improvement therein for indicating to the user of the mobile station the actual HOME/ROAM status thereof.

In current cellular mobile telephone systems (sometimes referred to as analog voice systems), as well as in proposed digital cellular systems, different service providers provide mobile telephone service in different geographical areas. Pursuant to FCC regulations, each service area is serviced by two providers: one a wire-line carrier, such as a conventional telephone operating company (e.g. Bell Atlantic, NYNEX, GTE, and the like) and the other a nonwire-line carrier (such as service providers who have not historically provided telephone switching service, e.g. McCaw Cellular, Rogers Cantel, Metro Mobile CTS, Inc., etc.). It is both impractical and uneconomical for a mobile telephone user to subscribe to several service providers; and subscription generally is limited to a single provider. The system to which a user subscribes is referred to as a "home" system, and the user enjoys lower costs when operating his mobile telephone within a service cell serviced by the "home" system. Even when the user moves from one cell to another in the "home" system, reduced pricing for use of "air time" still is enjoyed.

However, when a user is "handed off" from a service cell in his "home" system to a service cell that is served by a service provider to which the user does not subscribe, premium costs are incurred for the use of "air time" whether the user initiates an outgoing or receives an incoming telephone call. The service cells that are served by the provider to which the user does not subscribe are included in what is referred to as a "visited" system; and a user who moves into or through a visited system is referred to as a "roamer."

It is typical to provide a status indicator on the user's mobile telephone station to indicate the present HOME/ROAM status of the user, that is, to indicate to him if he is located in his "home" system or in a "visited" system. Since the boundaries of a cell are not clearly defined, a user located at the boundary between "home" and "visited" systems who wishes to initiate a telephone call may be willing to wait until he is well within his "home" system before doing so, thereby taking advantage of more favorable rates. The status indicator assists the user in recognizing when he has moved from a "visited" system to his "home" system and vice versa.

The determination of whether a mobile telephone user is "roaming" or is in his "home" system is based upon a system identification code SID. Upon subscribing to a service provider, the user's mobile station is encoded with an SID code which, typically, is a digital code that is stored in a nonvolatile memory (such as an EEPROM). When a mobile station is in an idle mode, power is supplied to it and it is prepared to initiate an outgoing telephone call or respond to an incoming call. In this idle mode, control messages which are transmitted periodically from the base station serving the service cell in which the mobile station is located These control messages include an SID code which represents the identification of the system that provides service to this cell. If the received SID code is equal to the stored SID code, the mobile station is located in its "home" system and a suitable indication is provided. Of course, the user of that mobile station enjoys more favorable tariffs if voice communication is established while he remains in his "home" system. Alternatively, if the received SID code differs from the stored SID code, the mobile station is a "roaming" station and a ROAM indication is provided. If the user communicates with the base station from which he has received this SID code, he is charged premium rates because of his "roaming" status.

One notable drawback of present cellular mobile telephone systems is the inability to indicate a change in HOME/ROAM status when the mobile station is in its active mode, that is, when the mobile station is in voice communication with a base station. This is because the SID code is transmitted from a base station on a channel (known as the forward control channel) that can be received by a mobile station only when that mobile station is in its idle mode. Hence, once a HOME/ROAM determination is made, it is "locked" when the mobile station changes over to its active mode. Although this failure to provide an updated indication is not particularly bothersome when the user of the active mobile station crosses from a "visited" system to a "home" system, this failure is most annoying when the user is handed off from a "home" base station to a "visited" base station because he will not be aware of the premium rates at which he is being charged. Although control messages are transmitted to and from an active mobile station, the convention of transmitting an SID code or other status indication messages during voice communication has not been recognized. Thus, a change in the HOME/ROAM status of a mobile station as it passes between "home" and "visited" systems heretofore has not been provided.

Another drawback in conventional cellular mobile telephone systems occasioned by this inability to apprise the user of an active mobile station of a change in his HOME/ROAM status relates to marketing restrictions. It would be attractive for a service provider to increase the number of subscribers to that service if arrangements can be made with the service provider in an adjacent geographic area such that subscribers to either system are treated as "home" stations when those subscribers "roam" into service cells serviced by the other provider. For example, in the metropolitan New York area, service in regions in southern New Jersey may be provided by Bell Atlantic, whereas service in regions in northern New Jersey and in New York City may be provided by NYNEX. It would be to the advantage of, for example, Bell Atlantic if it could advertise to its subscribers (and potential subscribers) that Bell Atlantic customers will be treated as "home" users in the service area serviced by NYNEX. If an appropriate commercial arrangement could be established between these service providers, the rates charged by, for example, NYNEX when a Bell Atlantic subscriber operates within a service cell serviced by NYNEX would be significantly reduced as compared to the normal "roaming" rates.

As a further marketing approach, it may be beneficial to service providers which operate in adjacent service cells, that is, in service cells which define a service boundary therebetween, to offer a "roaming" mobile station the benefit of "home" subscriber rates if the "roaming" mobile station operates in a border cell.

Although service providers are supplied with identifying data representing the identities of each idle and active mobile station within each cell in its service area, such identifying data (comprised of a Mobile Station Identifying number, or MIN, and an Electronic Serial Number, or ESN) is not used for much other than verifying the authenticity of a mobile station. But, if a service provider offers different types of service, such as an arrangement with an adjacent service provider to offer reduced air time rates for particular subscribers who operate in certain service cells of the "visited" system, such MIN and/or ESN codes would serve to identify those subscribers. A suitable indication of this preferential status could be provided at the mobile station itself. For example, one such subscriber who moves into particular service cells in the "visited" system may be provided with a HOME indication, thus apprising him that he may enjoy reduced tariffs even though he is "roaming" through a service area to which he is not a subscriber.

Unfortunately, the foregoing heretofore has not been possible in conventional cellular mobile telephone systems; and such selectivity of the HOME/ROAM indicator status is not presently being contemplated for digital cellular telephone systems. Thus, the marketing abilities of service providers are severely hampered by the inability to selectively control the HOME/ROAM status of a non-subscribing mobile station.

OBJECTS OF THE INVENTION

Therefore, it is an object of the present invention to provide improvements which overcome the aforementioned difficulties, drawbacks and disadvantages associated with conventional cellular mobile telephone systems.

Another object of this system is to provide a technique by which service providers in a cellular mobile telephone system may improve their service and attract additional subscribers by offering reduced "air time" costs to subscribers.

A further object of this invention is to provide a technique for selectively controlling the HOME/ROAM indicator status of a mobile station, whether that mobile station is idle or active, as it moves through service cells that are serviced by different providers.

An additional object of this invention is to transmit indicator status order control messages from a base station to a mobile station, whether that mobile station is in its idle or active mode, to identify that mobile station as a "home" station or a "roaming" station, as may be determined by the providers of service to the service cells through which the mobile station moves.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for use in a cellular mobile telephone system in which the mobile station is a subscriber to a home system which may or may not include the base station with which the mobile station wishes to communicate. When operating in an idle mode, the mobile station receives control messages from the base station, including system identification data (SID) and transmits control messages, including mobile station identification data (MIN) which announces the presence of the mobile station in the operating vicinity of the base station. The mobile station includes a system identification detector for detecting if the received SID identifies the home system of the mobile station. If so, a status indicator is activated to provide a HOME indication. If the received SID does not represent the mobile station home system, the status indicator provides a ROAM indication. The base station may transmit an indicator status order control message during either idle or active operation of the mobile station; and this indicator status order control message selectively activates or deactivates the mobile station status indicator notwithstanding the HOME/ROAM indication determined from the received SID.

In one embodiment, the indicator status order control message is transmitted from the base station over a forward control channel if the mobile station is in its idle mode, and over a forward voice channel if the mobile station is in its active mode. In another embodiment, the indicator status order control message is transmitted from the base station over a digital traffic channel.

As a feature of this invention, if the mobile station is handed off to a service cell serviced by a different service provider, the base station in the new service cell entered by the mobile station analyzes the mobile station identification data which it receives as part of the "handoff package" to transmit an indicator status order control message. Thus, if the mobile station enters a "visiting" cell, the indicator status order control message transmitted thereto by the base station in that cell activates the ROAM indicator, unless the mobile station is entitled to preferred tariffs for air time usage, whereupon the indicator status order control message activates a HOME indication. In other words, a mobile station in a "visited" system nevertheless may be designated a HOME station if the service provider for the "visited" system so elects. The normal HOME/ROAM indication may be overridden by the indicator status order control message.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF PREFERRED EMBODIMENTS

Figure 1:
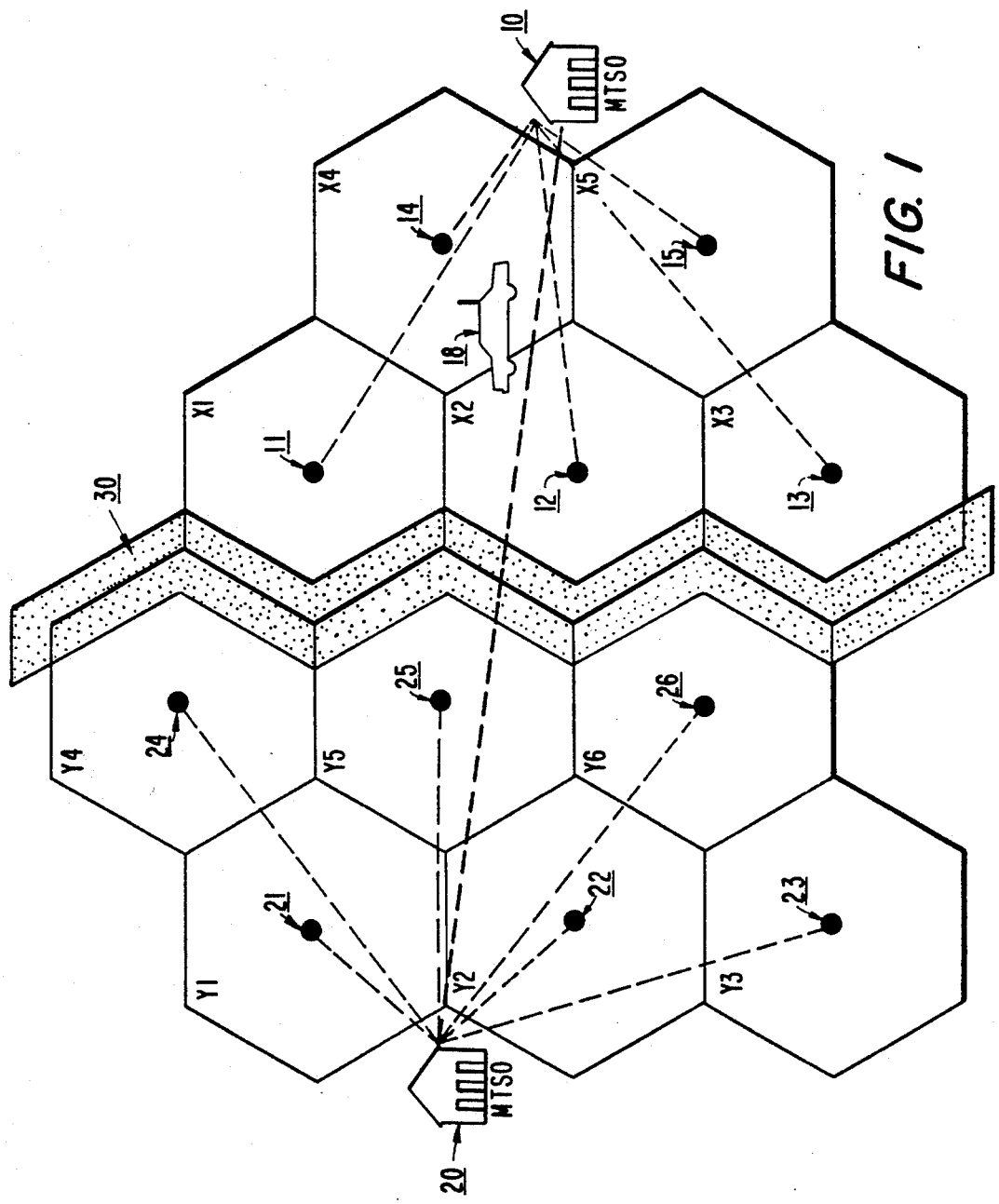
FIGS. 1 and 2 are simplified, schematic representations of a cellular mobile telephone system in which a mobile station travels.

Referring now to the drawings, wherein like reference numerals are used throughout, FIG. 1 is a simplified, schematic representation of a mobile cellular telephone system. It is assumed, for the purpose of the present description, that the geographic area illustrated in FIG. 1 is provided with cellular telephone service by two different systems, identified as system X and system Y. Following normal convention, each service cell is illustrated as an hexagonal area, and each cell is served by a cell site base station. Thus, in system X, cells X1, X2, ... X5 are served by base stations 11, 12, ... 15, respectively. Each cell site base station in system X is coupled to a mobile telephone switching office (MTSO) 10 by means of a communication cable, or wire, or alternatively, by means of a microwave communications link. For convenience, the communication path between a base station and MTSO 10 is referred to simply as a "land line" which may include wire cable, optic fiber cable, microwave, or the like.

FIG. 1 also illustrates another service provider, designated system Y, which provides service for cells Y1, Y2, ... Y6, and these cells are served by cell site base stations 21, 22, ... 26, respectively. As in system X, an MTSO 20 communicates with each of the system Y base stations by a land line. In addition, a dedicated line couples MTSO 10 of system X to MTSO 20 of system Y.

It is seen that systems X and Y provide service to adjacent geographic areas which define a border 30 therebetween. In practice, each service cell may not be sharply defined as an hexagonal area and the border 30 between adjacent service systems likewise may not be as sharply defined as shown in FIG. 1. Nevertheless, for the purpose of the present description, the border 30 is shown between cells X1, X2, X3 in system X and cells Y4, Y5 and Y6 in system Y.

The manner in which the illustrated mobile cellular telephone system operates is described in various texts, including, for example, *Mobile Cellular Telecommunications Systems* by William C. Y. Lee, McGraw-Hill Book Company (1989), and further description is not provided herein, except as is needed to understand the present invention.

Let it be assumed that a user of a mobile telephone station 18 subscribes to system X. In FIG. 1, the mobile station is schematically illustrated as an automobile, although it will be appreciated that the mobile station need not be limited solely to a vehicular telephone and is intended to include telephones that are transportable either in or out of a vehicle. Mobile station 18 is adapted to exhibit three different modes: a power-off mode, an idle mode and an active mode. In a power-off mode, no signals are transmitted from or received by the mobile station and, for all practical purposes, its presence is not recognized by the cellular telephone system. In the idle mode, mobile station 18 is prepared to initiate an outgoing telephone call or receive an incoming telephone call. In this operating mode, control messages are transmitted thereto from the base station serving the cell in which the mobile station is located, and other control messages are returned from the mobile station to that base station. The base station in each cell normally transmits control messages over dedicated control channels; and when mobile station 18 enters the idle mode, it is tuned to the strongest dedicated control channel. Since the carrier frequencies of the control channels differ from cell to cell, the tuning of the mobile station to the control channel having the highest signal strength thus establishes the particular cell in which the mobile station is presently located.

Control messages are transmitted by a base station over its dedicated control channels periodically. The control messages include system identification data ($SID_R$) which identifies the service provider for that cell. System identification data ($SID_S$) identifying the particular system, or service provider, to which mobile station 18 subscribes, is stored in the mobile station. A comparison of transmitted $SID_R$ to stored $SID_S$ determines whether the mobile station is located in its home system or if it has moved into a visited system.

When an idle mobile station moves from one cell within its home system to another, it receives the aforementioned control messages from the base station that serves the new cell. As is known to those of ordinary skill in the art, an idle mobile station returns control messages to the base station to which it is tuned, and the returned control messages include a registration message which contains the mobile station identification number (MIN) and an electronic serial number (ESN), thereby identifying the mobile station. Typically, the MIN represents a 10-digit directory telephone number and is transmitted as MIN1 (which represents the usual 7-digit directory number assigned to the mobile station) and MIN2 (which represents the 3-digit area code). By analyzing the MIN and ESN, the mobile station may be fully identified.

An active mode of mobile station 18 may be initiated either when the user wishes to transmit an outgoing telephone call to a remote party or the mobile station answers an incoming telephone call. As is conventional, if mobile station 18 is in transit while a telephone call is in progress, communication between the mobile station and the base station with which that mobile station is communicating may become weak. If the amplitude of the signal transmitted from the mobile station to the base station falls below a threshold, the mobile station is "handed off" to the base station which services the cell into which the mobile station has moved. The HANDOFF procedure is conventional and is controlled by MTSO 10. When handed off, the identification of the mobile station, such as the aforementioned MIN and ESN data, is relayed to the new base station (that is, the base station which services the cell into which the mobile station has moved) by MTSO 10 such that the information needed to communicate with the mobile station and to assess the proper tariffs for such communication are available to the new base station.

Consistent with the foregoing, let it be assumed that mobile station 18 travels from cell X4 to cell X2 in system X; and let it be further assumed that the mobile station is a subscriber to system X. If the mobile station is in its idle mode, it receives control messages transmitted from base station 14 periodically, including the $SID_R$. In the example discussed herein, it is assumed that mobile station 18 remains within its "home" system and, thus, $SID_R = SID_S$. Hence, the usual HOME/ROAM indicator included in mobile station 18 provides a HOME indication. The control messages transmitted periodically from base station 14 and received by mobile station 18 are transmitted on what is referred to as the forward control channel (FOCC). It is common in the cellular telephone art to refer to a "forward channel" as the channel which carries transmissions from a base station to a mobile station and to refer to a "reverse channel" as the channel which carries transmissions from a mobile station to the base station.

As mobile station 18 approaches the border between cells X4 and X2, the signal strength of the control messages, such as the registration message which includes MIN1, MIN2 and ESN, returned from the mobile station to base station 14 over the reverse control channel decreases. When this signal strength falls below a threshold, the forward and reverse control channels assigned for use by the mobile station ar changed to those of base station 12; and mobile station 18, while remaining in its idle mode, now receives control messages over the forward control channel from base station 12 and returns control messages over the reverse control channel to that base station. As shown in FIG. 1, cell X2 is served by system X; and, therefore, the system identification code transmitted by base station 12 is equal to the system identification code stored in the mobile station ($SID_R = SID_S$). Thus, the HOME/ROAM indicator included in mobile station 18 continues to provide a HOME indication.

Figure 2:
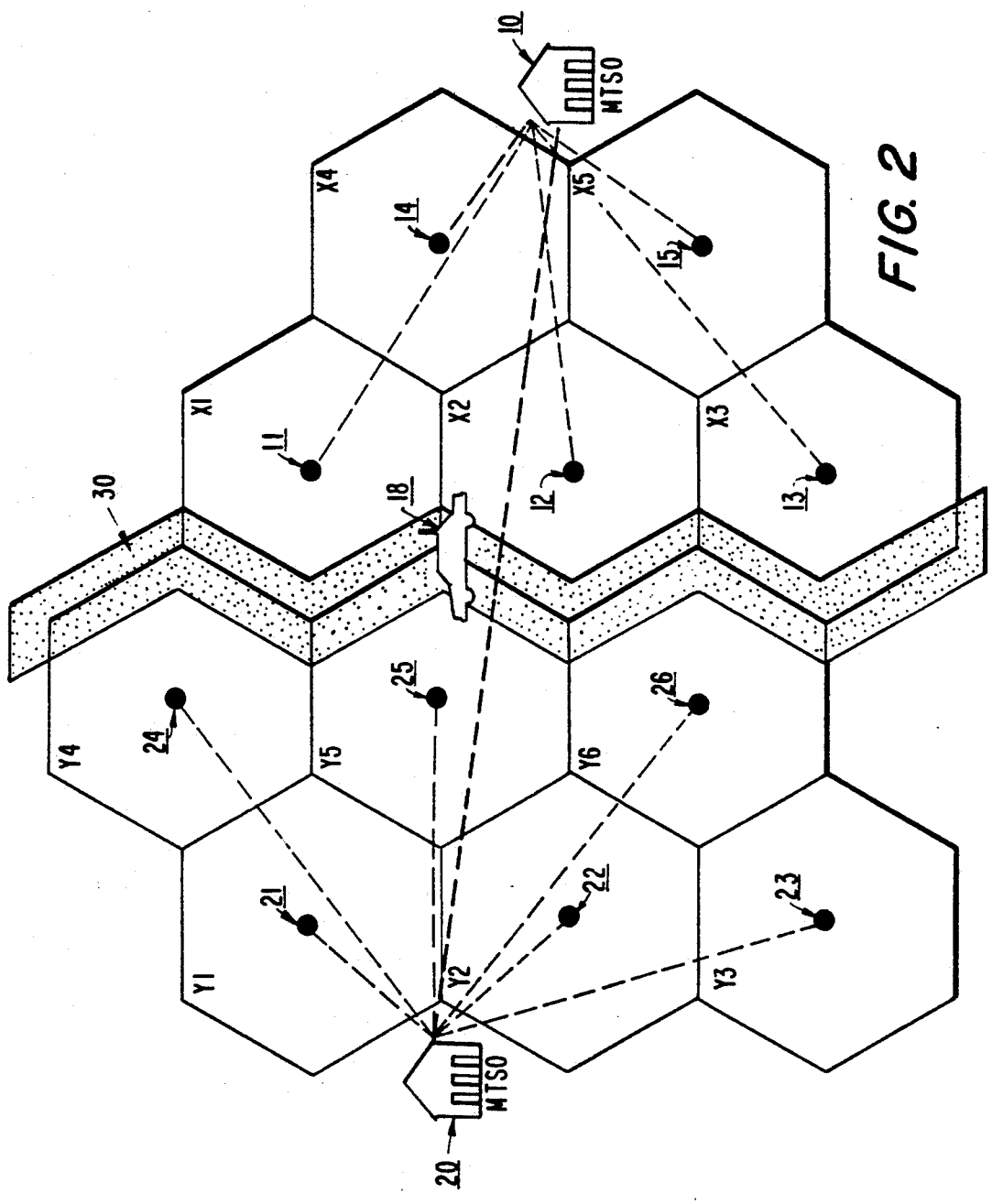
Figure 3:
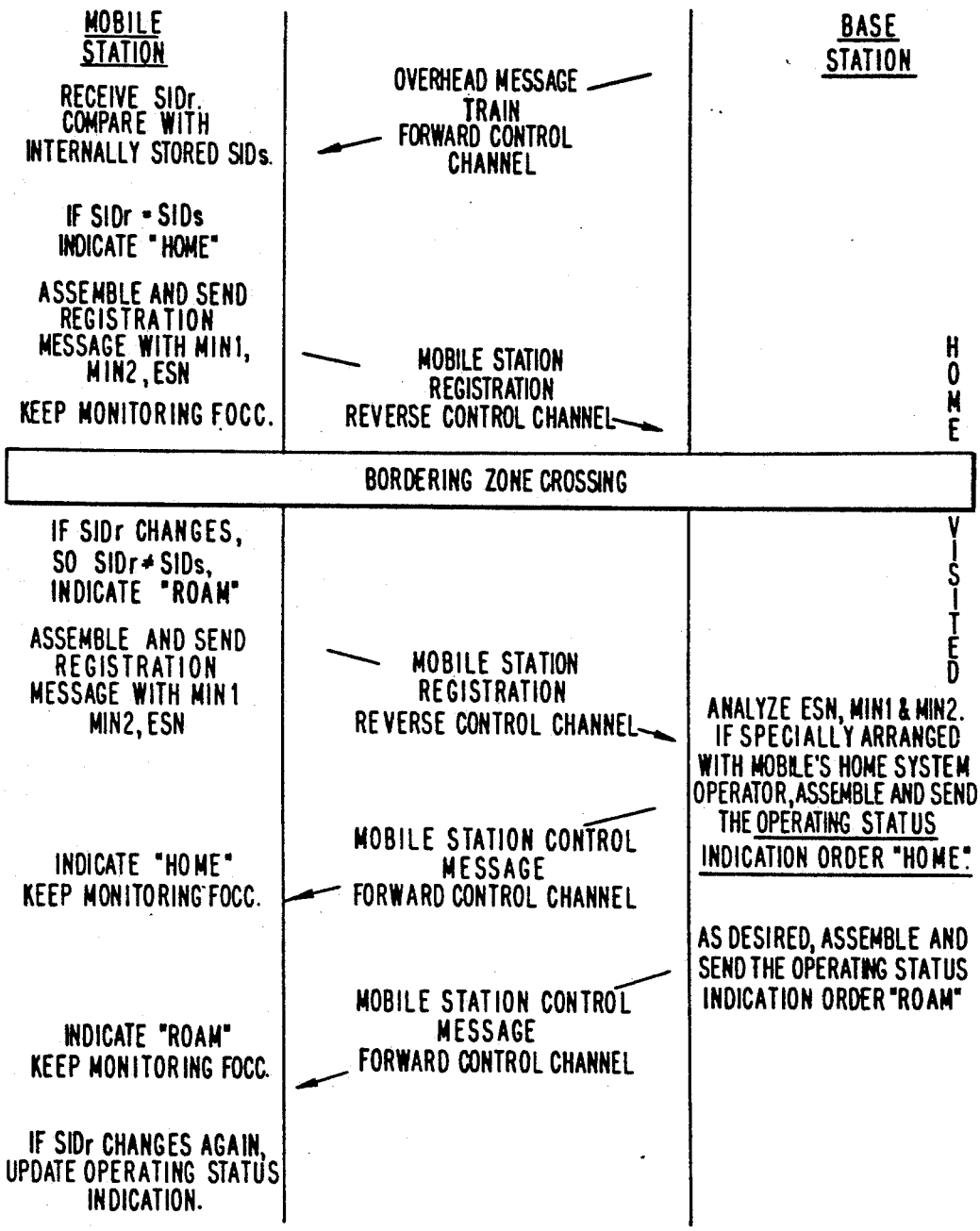
FIGS. 3 and 4 are explanatory flow charts which describe how the present invention is used when a mobile station ROAMS into a visited system.

Referring to FIG. 2, let it be assumed that as mobile station 18 travels through cell X2, it crosses into adjacent cell Y5 which is included in system Y and is served by a service provider to which the mobile station does not subscribe. A shown in the explanatory flow chart of FIG. 3, while the mobile station is within cell X2, it receives signal identification data $SID_R$ from base station 12 over the forward control channel, as aforementioned. This code is included in a control message contained in what normally is referred to as an overhead message train which is monitored by the mobile station. As before, the received system identification code is compared with the system identification code stored in, for example, a nonvolatile memory at mobile station 18; and if the received system identification code is the same as the stored system identification code, that is, if $SID_R = SID_S$, a HOME indication is provided.

While it its idle mode, the mobile station assembles and periodically returns to base station 12 over the reverse control channel a registration message (including mobile station identification data MIN1, MIN2 and ESN) that identifies the mobile station.

When mobile station 18 crosses bordering zone 30 and enters cell Y5, it continues to monitor the forward control channel transmitted by base station 25. As before, the system identification code is transmitted periodically by the base station; but now $SID_R \neq SID_S$. Hence, the HOME/ROAM indicator in mobile station 18 now provides a ROAM indication.

The mobile station returns its registration message including MIN1, MIN2 and ESN over the reverse control channel to base station 25. Assuming that base station 25 had not yet received this registration message and had not yet been apprised of the mobile station identity, it analyzes the received mobile station identification data to determine if this is a selected mobile station that should be assigned preferential status, namely "home" status. More particularly, if the service provider for system Y has arranged with the service provider for system X to permit subscribers to system X to be treated as "home" users when those subscribers are located within cells that border the system X operating region, then mobile station 18 will be recognized as a system X subscriber and will be treated as a "home" user when, in fact, it is within the visited system Y. Other arrangements between service providers are accommodated in accordance with the present invention, such as according preferential status to a subscriber of one system when that subscriber operates only in predetermined cells that are serviced by the other system. Hence, mobile station 18 may be assigned such preferential status when located in, for example, cells Y4, Y5 and Y6, or when located within any or all of the cells of system Y, as may be arranged between the system X and system Y service providers.

In accordance with this invention, if mobile station 18 is to be assigned preferential status when located in cell Y5, as may be determined by the base station when the mobile station identification data is recognized, base station 25 transmits an indicator status order control message over the forward control channel to the mobile station. In this case the indicator status order control message commands the indicator at mobile station 18 to provide a HOME indication. Thus, the indicator status order control message operates to override the normal HOME/ROAM indication that had been obtained by comparing the system identification code $SID_R$ transmitted by base station 25 to the system identification code $SID_S$ stored at the mobile station.

As mobile station 18 continues to move through cell Y5, it eventually may enter an adjacent cell, such as cell Y1. If the arrangement between the system X and system Y service providers limits the assignment of preferential status to mobile station 18 only to neighboring cells, such as cells Y4, Y5 and Y6, then the mobile station no longer would be entitled to such preferential status when it enters cell Y1.

In accordance with this assumption, when the location of mobile station 18 within cell Y1 is recognized, as when the mobile station is tuned to the forward and reverse control channels at which base station 21 operates, the mobile station identification data included in the registration message returned to base station 21 over the reverse control channel is analyzed, from which the base station determines that mobile station 18 is a "roamer." Accordingly, the base station transmits an indicator status order control message to mobile station 18 over the forward control channel which activates the status indicator to provide a ROAM indication. Thus, the status indication is changed over from HOME to ROAM when the mobile station enters a service cell in which it is not entitled to preferential status.

It will be appreciated that the foregoing operation may be repeated when mobile station 18 "roams" from one cell to another in system Y. If an indicator status order control message is not transmitted from a base station in system Y to mobile station 18, the HOME/ROAM indicator need not be updated from its ROAM indication until the system identification code transmitted to the mobile station from a base station is equal to the system identification code that is stored at the mobile station, as when the mobile station returns to its home system X. It will be seen that it is not necessary for an indicator status order control message to be transmitted over the forward control channel from each base station included in system Y. For example, if the arrangement between the service providers for systems X and Y is such that HOME status is assigned only when a system X subscriber is located in a system Y border cell (e.g. cells Y4, Y5 or Y6), then only the base stations which service these border cells need transmit the indicator status order control message so as to override the indication derived from SID comparison.

The indicator status order control message is compatible with existing order and order qualification codes that have been adopted for cellular telephone communication by the EIA/TIA. An example of a suitable indicator status order control message is as follows:

| Order Code | Code Qualification Code | Message Type | Function |
|---|---|---|---|
| 01111 | 010 | 00001 | Operating Status Indication - HOME |
| 01111 | 010 | 00010 | Operating Status Indication - ROAM |

In the example discussed above in conjunction with FIG. 2, it has been assumed that mobile station 18 roams from its "home" system into a "visited" system while in its idle mode. Let it now be assumed that mobile station 18 is in its active mode, that is, it is in voice communication with base station 12 of cell X2 as it crosses border zone 30 and enters cell Y5. When in its active mode, voice data is transmitted from base station 12 to mobile station 18 over a forward voice channel and voice data is returned from the mobile station to the base station over a reverse voice channel. The voice channels are changed by the conventional handoff procedure, known to those of ordinary skill in the art, when mobile station 18 crosses into cell Y5. Suffice it to say that when the mobile station is handed off from base station 12 to base station 25, the mobile station identification data (MIN1, MIN2 and ESN) that had been transmitted previously to base station 12 is transferred to base station 25 by the land line which interconnects MTSO 10 and MTSO 20. In particular, this mobile station identification data received by base station 12 is transferred to MTSO 10 by the land line which interconnects the base station with the mobile telephone switching office; and after being transferred from MTSO 10 to MTSO 20, the mobile station identification data which identifies mobile station 18 is transferred to base station 25 by the land line that connects this base station to MTSO 20.

Figure 4:
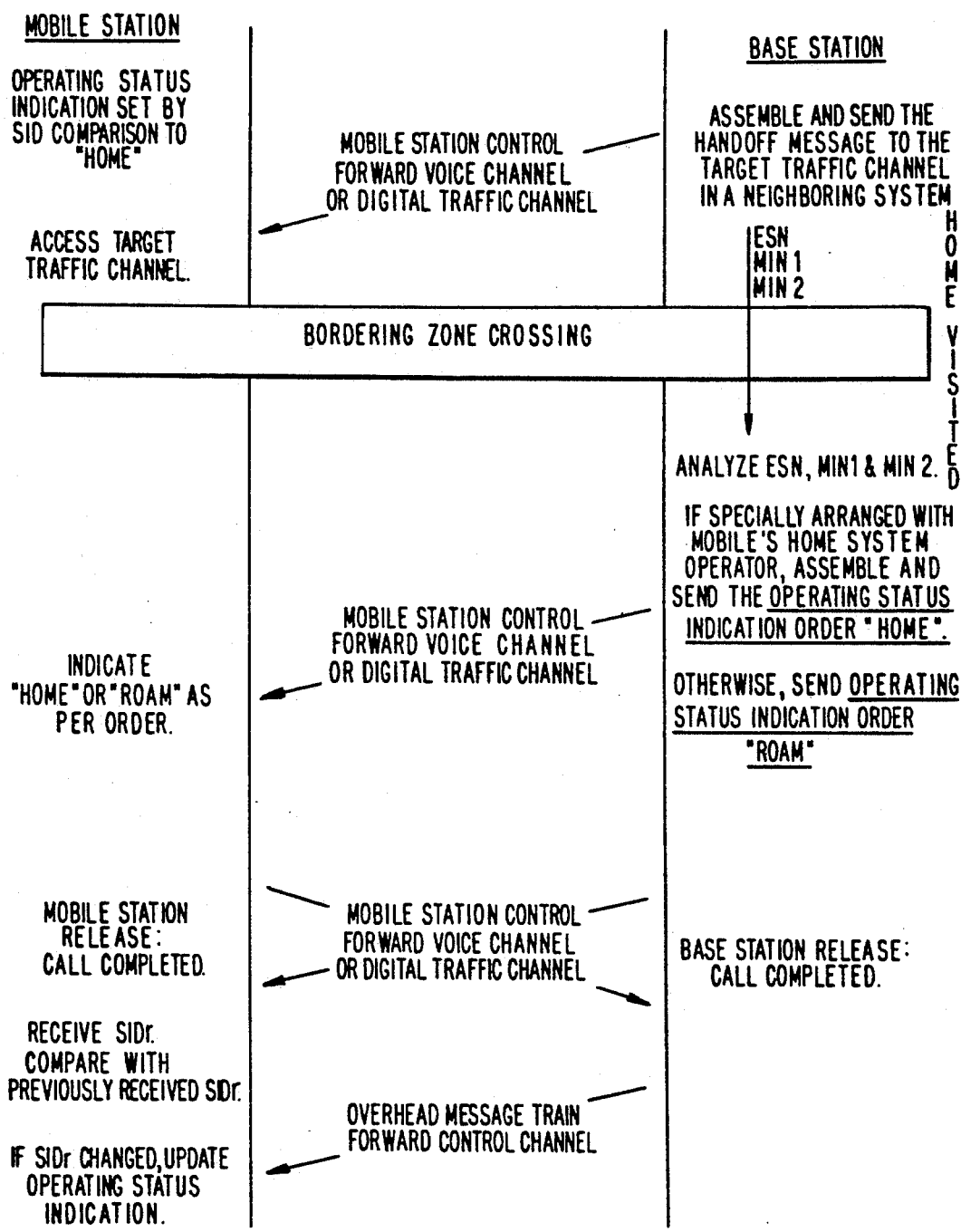

Referring to the explanatory flow chart of FIG. 4, when mobile station 18 is to be handed off from base station 12 to base station 25 (as shown in FIG. 2), as when the signal strength of the reverse voice channel falls below a threshold, the usual HANDOFF message is assembled by base station 12, transferred to MTSO 10, further transferred to MTSO 20 and finally to base station 25. In addition, a control message is transmitted from base station 12 to mobile station 18 over the forward voice channel, commanding the mobile station to be tuned to the forward voice channel of base station 25. Thus, communication from the mobile station continues as it is handed off from base station 12 to base station 25.

Assuming that the service providers for systems X and Y have the arrangement mentioned above, such that mobile station 18 is assigned "home" status when it operates within cell Y5, base station 25 analyzes the mobile station identification data (MIN1, MIN2 and ESN) which is transferred thereto during the handoff operation and which identifies mobile station 18. Based upon this analysis of the mobile station identification data, base station 25 recognizes mobile station 18 as a preferred visitor. Accordingly, base station 25 assembles and transmits a HOME indicator status order control message to mobile station 18 over the forward voice channel; and this received indicator status order control message is sensed and used in the mobile station to override the ROAM indication that would otherwise be provided because $SID_R \neq SID_S$. Therefore, even though mobile station 18 has "roamed" into visited system Y, because of the arrangement between the system X and system Y service providers, the mobile station is assigned preferential status which is indicated by the HOME indication.

If mobile station 18 travels into another cell of system Y, the foregoing handoff procedure is repeated; and an indicator status order control message is transmitted from the new base station to the mobile station over the new forward voice channel, thereby driving the HOME/ROAM indicator to provide a suitable indication. Thus, if the service provider for system Y agrees to assign preferential status to mobile station 18, the HOME indication is provided. Alternatively, if the mobile station enters a cell in which it is not entitled to preferential status, the indicator status order control message transmitted thereto results in a ROAM indication.

It is appreciated that, in accordance with conventional cellular telephone practice, a system identification code is not transmitted to the mobile station when in its active mode, even if the mobile station is handed off to a cell in a "visited" system. Thus, heretofore, when mobile station 18 traveled from cell X2 to cell Y5, the HOME indication that was produced at the time that the mobile station was in its idle mode in cell X2 remained. However, in accordance with the present invention, if there is no arrangement between the service providers for systems X and Y to provide preferential status to visiting subscribers, the indicator status order control message transmitted to mobile station 18 by base station 25 when the mobile station enters cell Y5 during its active mode produces a correct ROAM indication. Consequently, the user of mobile station 18 is apprised of this change in status as he crosses border zone 30. At the very least, the user thus is made aware that his telephone conversation is subject to premium tariffs because he is "roaming" in a visited system. Of course, if mobile station 18, while in its active mode, returns to a cell included in system X, the identification of the mobile station as being a subscriber to system X is recognized as a result of the aforementioned analysis of the mobile station identification data that is transferred to the new base station with which the mobile station communicates as part of the handoff procedure. Accordingly, the new base station now transmits the HOME indicator status order control message to mobile station 18 over the forward voice channel, which results in a HOME indication at the mobile station.

At the completion of the telephone call, a RELEASE protocol is carried out, including control messages transmitted from the base station to the mobile station over the forward voice channel and control messages transmitted from the mobile station to the base station over the reverse voice channel. At the completion of this protocol, the mobile station is released from the base station and the mobile station returns to its idle mode in preparation for receiving or initiating another telephone call. As before, when in this idle mode, the mobile station receives system identification data over the forward control channel; and this received system identification data is compared to the system identification data stored at the mobile station to provide the appropriate HOME/ROAM indication. It will be appreciated that if the foregoing telephone call is completed while the mobile station is "roaming" in a cell in the "visited" system, $SID_R \neq SID_S$ and a ROAM indication is provided. Of course, if the telephone call was completed at a time that the mobile station was located within its "home" system, then $SID_R = SID_S$ and the HOME indication is provided.

Figure 5:
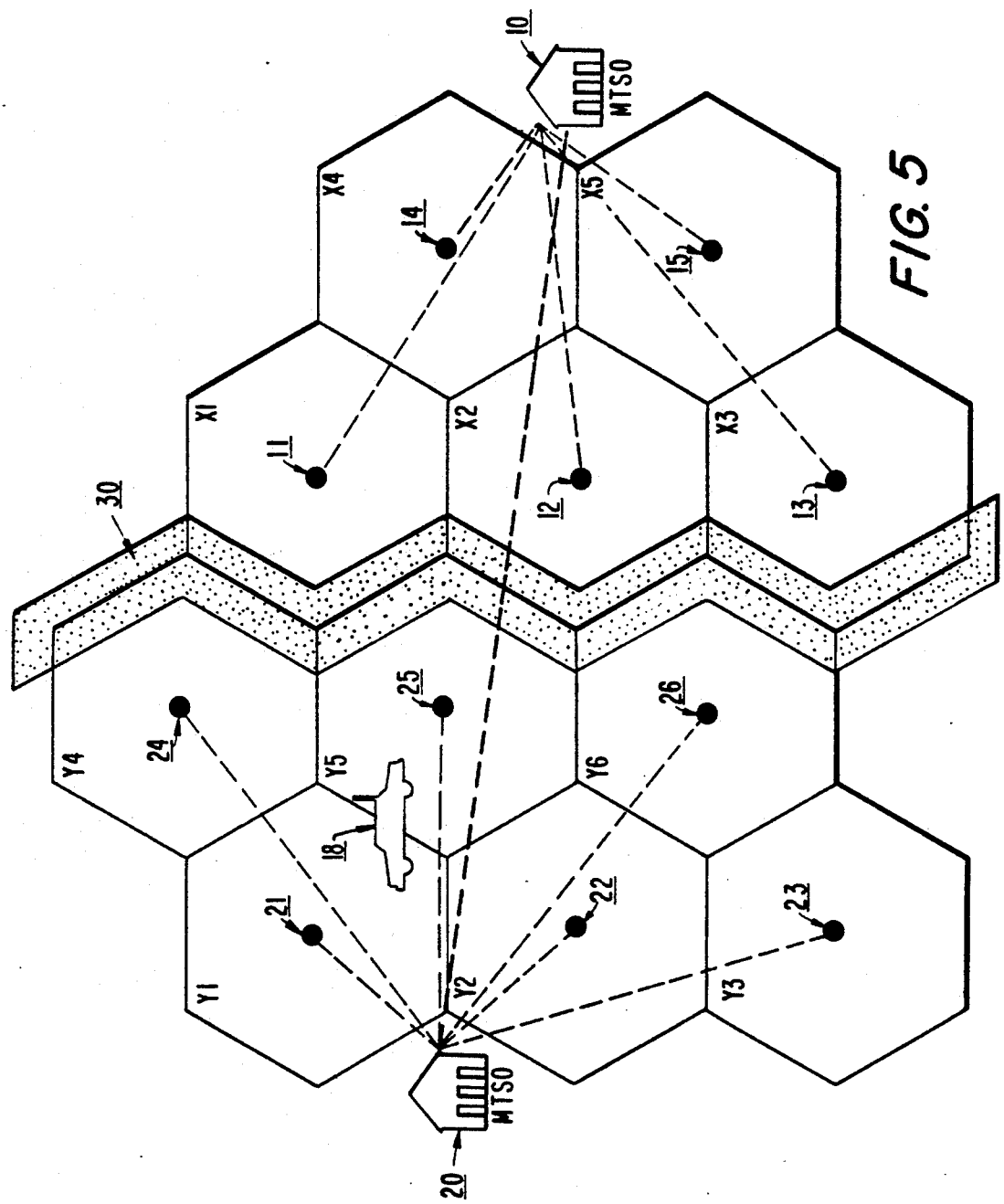
FIG. 5 is a simplified, schematic diagram of a cellular mobile telephone system showing a mobile station that "roams" in a visited system.
Figure 6:
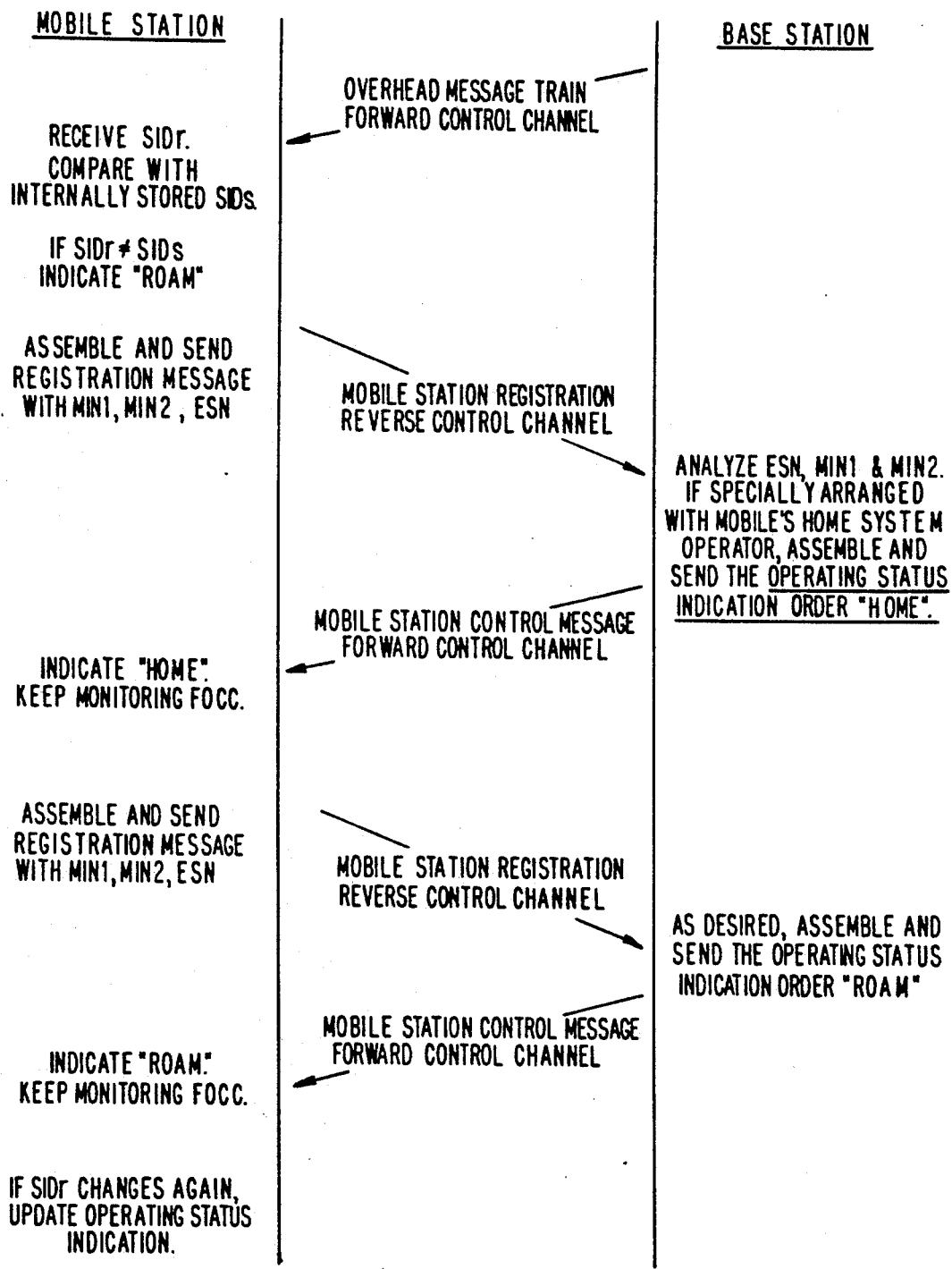
FIGS. 6 and 7 are explanatory flow charts which are useful in explaining the manner in which the present invention operates when a mobile station "roams" in a visited system.

The foregoing discussion has assumed that mobile station 18 "roams" into system Y (to which it is not a subscriber) while in the active mode. Let it now be assumed that mobile station 18 "roams" throughout "visited" system Y while in its idle mode. This "roaming" within system Y is schematically represented in FIG. 5; and FIG. 6 is an explanatory flow chart of the manner in which the HOME/ROAM status indicator at mobile station 18 is controlled. While in its idle mode, the usual overhead message train is transmitted to the mobile station over the forward control channel from the base station which services the cell in which the mobile station presently is located. Let it be assumed that idle mobile station 18 is within cell Y5. Accordingly, the system identification data included in the control message of the overhead message train differs from the system identification data stored in the mobile station. Since $SID_R \neq SID_S$, the ROAM indication is provided.

As was also discussed above, mobile station 18 assembles a control message, including the registration message which contains the mobile station identification data MIN1, MIN2 and ESN. This mobile station identification data is transmitted from the mobile station to base station 25 over a reverse control channel. It is appreciated that system identification data is transmitted periodically from the base station and mobile station identification data is transmitted periodically from the mobile station.

Let it be further assumed that the service providers for system X and system Y have agreed that when a subscriber of one system "roams" into an adjacent cell serviced by the other, that subscriber will be assigned preferential status even though it has "roamed" into a "visited" system. Now, base station 25 analyzes the mobile station identification data received from mobile station 18 and recognizes this mobile station as being a system X subscriber and entitled to preferential status. Consequently, base station 25 assembles the HOME indicator status order control message; and this message is transmitted to mobile station 18 over the forward control channel. When received at the mobile station, the HOME indicator status order control message is sensed and activates the HOME/ROAM status indicator to provide a HOME indication.

As is conventional, mobile station 18 continues to monitor the forward control channel of base station 25. If the idle mobile station now enters cell Y1, the forward control channel used by base station 21 is monitored. As is also conventional, mobile station 18 now transmits its mobile station identification data to base station 21 over the reverse control channel associated with that base station. As before, the received mobile station identification data is analyzed by the base station and, depending upon the arrangement between the service providers of systems X and Y, the base station may or may not assign preferential status to the mobile station. For example, if preferential status is available only in border cells of system Y, then when mobile station 18 moves into cell Y1 it no longer is entitled to HOME status. Consequently, base station 21 assembles the ROAM indicator status order control message, which is transmitted to the mobile station over the forward control channel to produce a ROAM indication at the mobile station.

The foregoing operation continues as mobile station 18 moves through system Y. If the mobile station enters a system serviced by yet another service provider, the system identification data received from a cell in that new system is compared to the system identification data stored at the mobile station so as to update the HOME/ROAM indicator.

Let it now be assumed that the "roaming" mobile station through system Y (to which the user is not a subscriber) is in its active mode. For example, let it be assumed that mobile station 18 is in voice communication with base station 25. In accordance with the previous assumptions relating to the "roaming" mobile station through system Y, even though $SID_R \neq SID_S$, the HOME/ROAM indicator at mobile station 18 is activated by the indicator status order message transmitted from base station 25 to provide a HOME indication. Now, as the mobile station 18 leaves cell Y5 and enters cell Y4, the conventional handoff procedure is followed. A suitable control message is transmitted from base station 25 to mobile station 18 over the forward voice channel to tune the mobile station to the forward and reverse voice channels associated with base station 24. In addition, the mobile station identification data (MIN1, MIN2 and ESN) which had been transmitted to and stored at base station 25 is transferred to base station 24 by way of MTSO 20. Base station 24 analyzes this mobile station identification data and recognizes mobile station 18 as being a "visitor" from system X and, thus, entitled to preferential status. Accordingly, base station 24 assembles and transmits to the mobile station the HOME indicator status order control message. It is appreciated that this control message is transmitted over the forward voice channel.

The received HOME indicator status order control message is sensed at the mobile station to provide a HOME indication.

It is recognized that if mobile station 18 had been handed off from base station 25 to base station 21, the analysis at base station 21 of the mobile station identification data would have resulted in the assembly and transmission of the ROAM indicator status order control message to the mobile station because mobile station 18 is assumed herein not to be entitled to preferential status in cell Y1.

Figure 7:
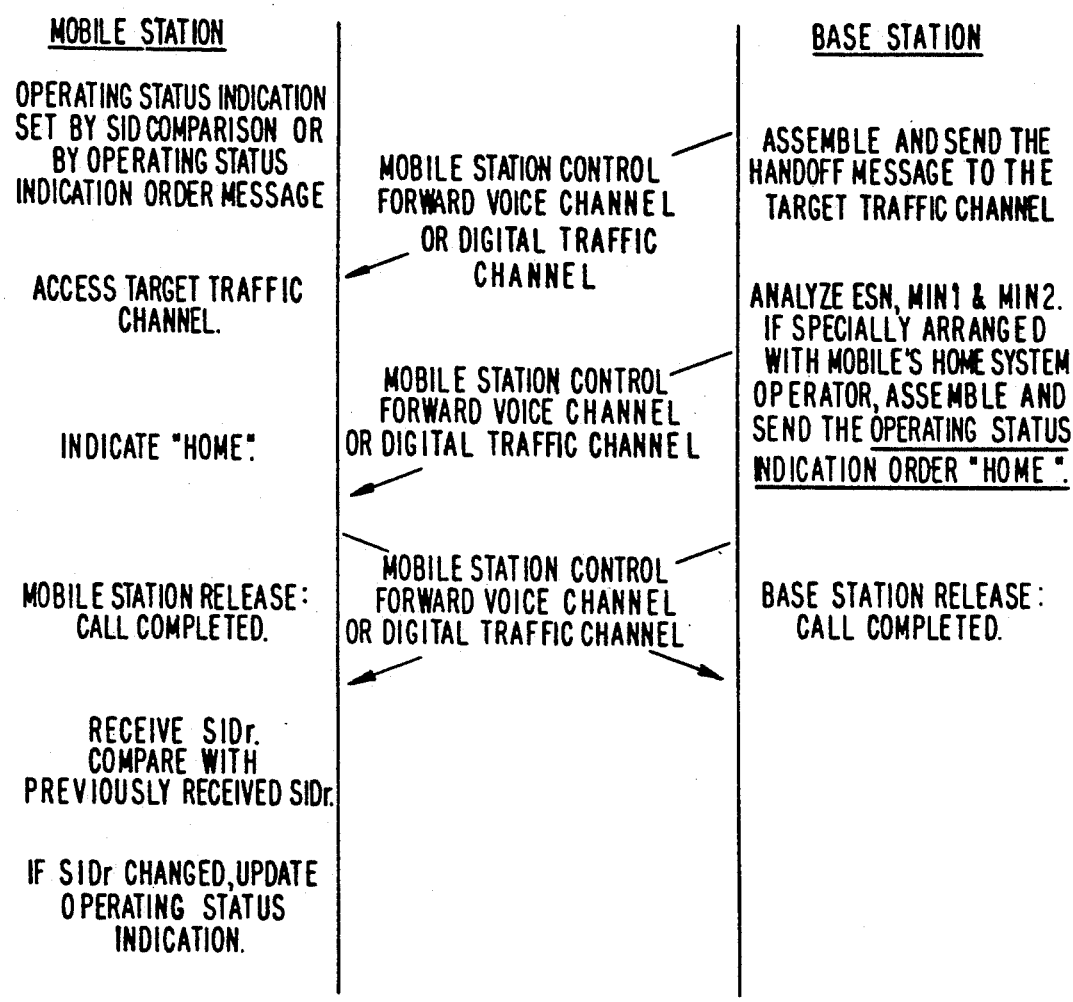

As before, if the telephone call with which mobile station 18 is involved terminates, the RELEASE protocol is followed and mobile station 18 returns to its idle mode. As indicated in FIG. 7, suitable RELEASE control messages are transmitted from the base station to the mobile station over the forward voice channel and release control messages are returned from the mobile station to the base station over the reverse voice channel. Even though the mobile station continues to "roam" within system Y, it is prepared to initiate or receive another telephone call. Of course, when in its idle mode, the mobile station monitors the forward control channel of the base station serving the cell in which that mobile station is located. Each time system identification data is received over the forward control channel, it is compared to the system identification data stored at the mobile station to update the HOME/-

ROAM indicator. Likewise, the forward control channel is monitored for an indicator status order control message which may override the HOME/ROAM indication normally attributed to the SID comparison.

In the examples described in conjunction with FIGS. 1-7, it has been assumed that the cellular mobile telephone system is of the so-called conventional analog type. The present invention nevertheless may be used with digital cellular telephone systems which have been developed and proposed; and in that event, the various control messages are transmitted over a digital traffic channel in place of the forward/reverse control channel or the forward/reverse voice channel.

Figure 8:
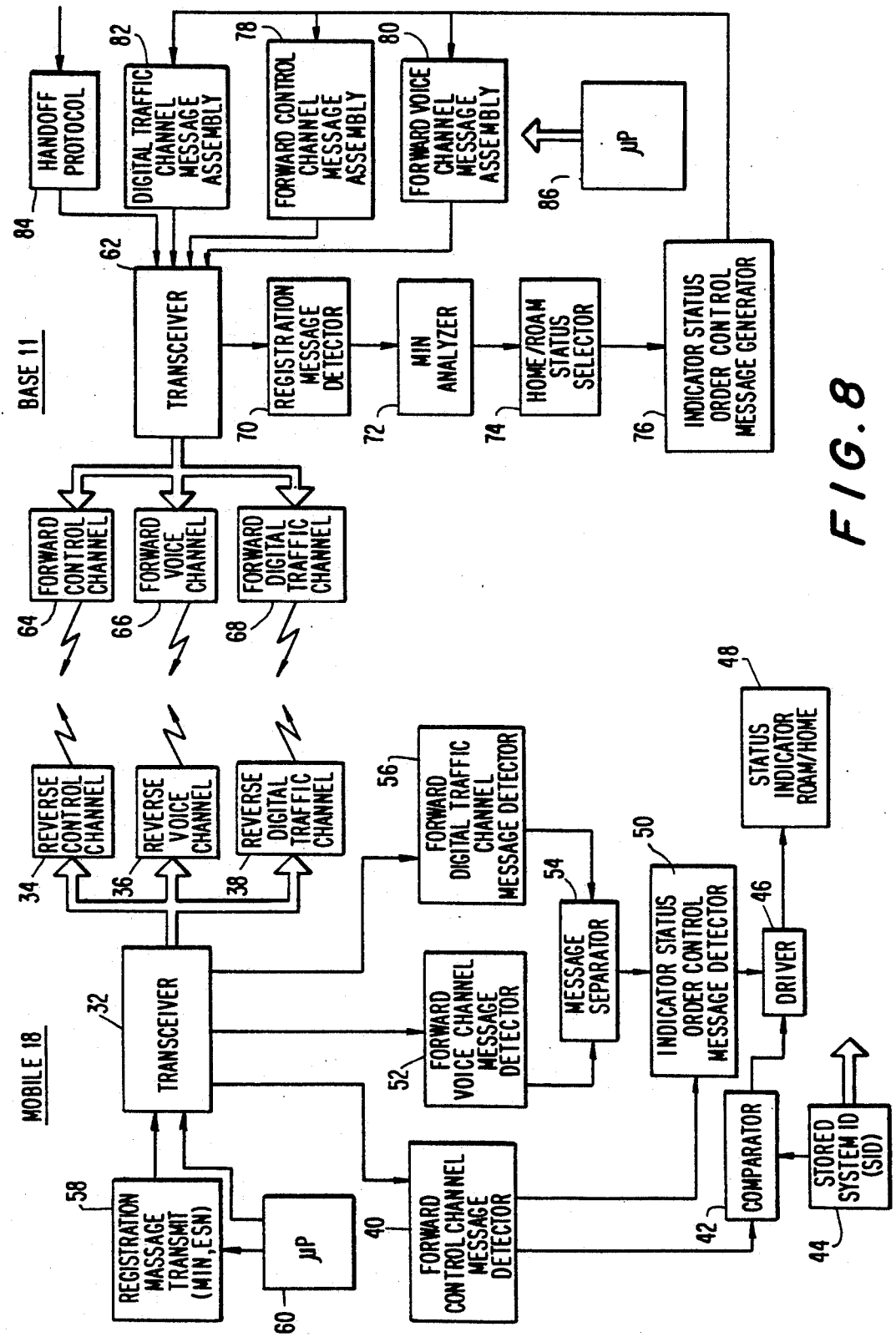
FIG. 8 is block diagram showing one embodiment of the present invention.

Referring now to FIG. 8, a block diagram representing mobile station 18 and a base station, such as base station 11, is illustrated. Only those portions of the mobile and base stations which are needed for an understanding of the present invention are illustrated and described. Accordingly, mobile station 18 is comprised of a transceiver 32, a forward control channel message detector 40, a comparator 42, a status indicator 48, an indicator status order control message detector 50, a forward voice channel detector 52 and a registration message transmitter 58. Transceiver 32 includes transmit and receive circuitry, as is conventional, and is coupled to a suitable antenna system for transmitting and receiving control messages and encoded voice data as is conventional in cellular mobile telephone systems. Transceiver 32 is illustratively connected to a reverse control channel 34 and a reverse voice channel 36 to point out that control and voice data are transmitted to the base station over separate channels which are distinct from the channels over which control and voice data are transmitted to the mobile station from the base station. FIG. 8 also shows a reverse digital traffic channel 38 coupled to transceiver 32 to illustrate the use of the present invention in a digital cellular mobile telephone system which includes a digital traffic channel.

Transceiver 32 is coupled to forward control channel message detector 40 and is adapted to detect various control messages that may be included in the overhead message train transmitted from the base station. For the purpose of the present invention, forward control channel message detector 40 is particularly adapted to detect system identification data $SID_R$ and an indicator status order control message.

The forward control channel message detector includes one output coupled to comparator 42 and another output coupled to indicator status order control message detector 50. It will be appreciated that the received system identification data $SID_R$ is coupled to comparator 42 whereat it is compared with the system identification data $SID_S$ stored in a suitable memory 44, such as a nonvolatile memory. The output of comparator 42 is coupled to HOME/ROAM status indicator 48 (referred to hereinafter simply as the status indicator) by way of a suitable driver 46. Status indicator 48 may provide a visual indication and, in one embodiment, includes an LED that is energized when $SID_R \neq SID_S$.

Indicator status order control message detector 50 is adapted to detect an indicator status order control message that may be received by forward control channel message detector 40. The indicator status order control message detector also is coupled to forward voice channel detector 52 by way of a message separator 54. Message separator 54 is adapted to separate control messages from voice data received by the mobile station over the forward voice channel. Accordingly, if a HOME or ROAM indicator status order control message is received over the forward control channel or the forward voice channel, that indicator status order control message is detected by detector 50 which is coupled to driver 46. An output from indicator status order control message detector 50 overrides the output supplied to driver 46 by comparator 42, whereupon status indicator 48 is driven as a function of the output of detector 50.

An output of transceiver 32 also is coupled to a forward digital traffic channel detector 56 which is provided when mobile station 18 is used in a digital cellular telephone system. It is seen that an output of the forward digital traffic channel detector is coupled to message separator 54 which is adapted to separate an indicator status order control message that may be received and detected by the forward digital traffic channel detector. Digital voice data received by forward digital traffic channel detector 56 are supplied to other circuitry (not shown).

Registration message transmitter 58 is coupled to an input of transceiver 32 and is adapted to supply to the transceiver a registration message which includes the mobile station identification data (MIN1, MIN2 and ESN).

A conventional microprocessor 60 is coupled to registration message transmitter 58, transceiver 32 and the other operative circuits to control the operations thereof. For simplification and convenience, the specific connections and control data supplied from the microprocessor to the respective circuits are not illustrated.

Before describing the operation of the circuits comprising mobile station 18 in FIG. 8, reference is made to the structure of base station 11. The base station is comprised of a transceiver 62, similar to transceiver 32, a registration message detector 70, a mobile station identification analyzer 72, a HOME/ROAM selector 74, an indicator status order control message generator 76 and message assemblers 78, 80 and 82. FIG. 8 shows that transceiver 62 is coupled to a forward control channel 64, a forward voice channel 66 and a forward digital traffic channel 68 to illustrate the conventional use of these channels for transmitting control and voice data to mobile stations.

Transceiver 62 is coupled to registration message detector 70 and is adapted to supply to the detector a registration message received from, for example, mobile station 18. The registration message detector is coupled to mobile station identification analyzer 72 which is adapted to analyze the mobile station identification data (MIN1, MIN2 and ESN) included in a registration message.

Analyzer 72 is coupled to HOME/ROAM selector 74 and is adapted to control this selector as a function of the mobile station identification analysis. For example, analyzer 72 may be provided with mobile station identification data representing each "visiting" mobile station to which preferential status is to be assigned. If the mobile station identification data supplied to analyzer 72 by registration message detector 70 represents one of these predetermined mobile stations, HOME/ROAM selector 74 is controlled to supply a HOME selection to indicator status order control message generator 76. Accordingly, a HOME indicator status order control message is generated. Alternatively, if the mobile station identification data supplied to analyzer 72 does not represent one of these predetermined mobile stations, HOME/ROAM selector 74 is controlled to supply a ROAM selection to control message generator 76.

Message generator 76 is coupled to transceiver 62 by way of a forward control channel message assembler 78 or a forward voice channel message assembler 80. If base station 11 is transmitting control messages to an idle mobile station, forward control channel message assembler 78 is selected to assemble a suitable control message which includes the indicator status order control message supplied thereto by message generator 76. Alternatively, if base station 11 is in communication with an active mobile station, forward voice channel message assembler 80 is selected to assemble the indicator status order control message as part of the control messages normally transmitted to the mobile station over the forward voice channel.

FIG. 8 also shows a digital traffic channel message assembler 82 to illustrate that, when the present invention is used in a digital cellular telephone system, the indicator status order control message produced by message generator 76 is assembled for transmission over the forward digital traffic channel to the mobile station. Digital traffic channel message assembler 82 may be used to transmit control messages to an idle or active mobile station. It is appreciated that such messages are transmitted over forward digital traffic channel 68.

Transceiver 62 also is coupled to a handoff protocol controller 84 which controls the usual HANDOFF procedure. This procedure is known to those of ordinary skill in the art and further description of handoff protocol controller 84 need not be provided.

A microprocessor 86 is included in base station 11 and is adapted to control the operation of the respective circuits included in the base station. This microprocessor is conventional; and in the interest of simplification the particular connections and control data supplied to and from the microprocessor are not illustrated.

The manner in which base station 11 and mobile station 18 operate now will be described in conjunction with the flow charts of FIGS. 9-11. It will be appreciated that these flow charts represent the operation of microprocessor 60 at mobile station 18. From the following description, one of ordinary skill in the art will fully appreciate the manner in which the base station operates and, therefore, in the interest of brevity, similar flow charts describing the operation of microprocessor 86 are not needed.

Figure 9:
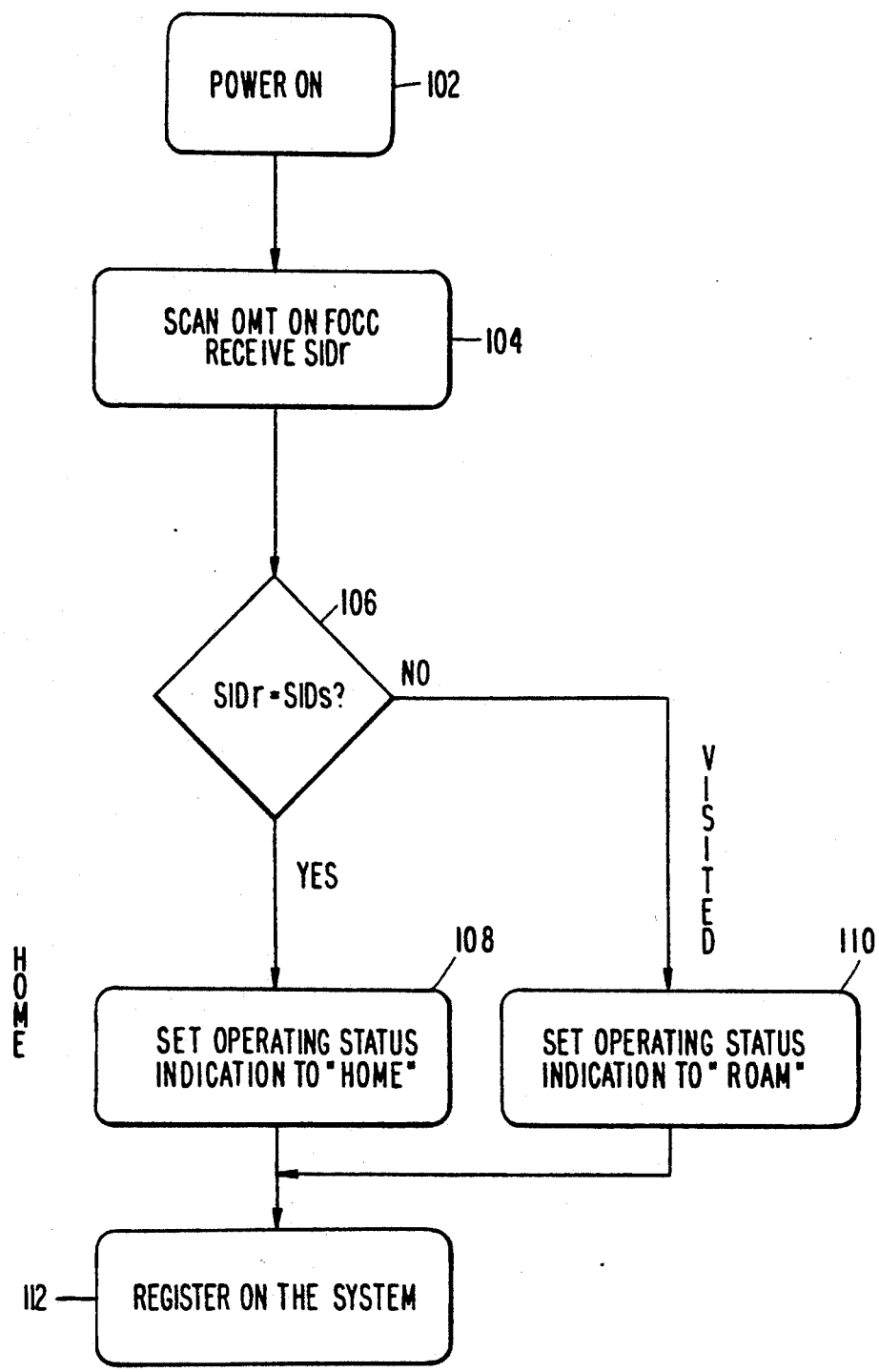
FIGS. 9–11 are flow charts of the routines carried out at the mobile station in accordance with the present invention.

Let it be assumed that power to mobile station 11 is turned on, as represented by instruction 102 of the flow chart shown in FIG. 9. As shown by instruction 104, microprocessor 60 controls transceiver 32 to scan the overhead message train transmitted from base station 11 on forward control channel 64. When system identification data $SID_R$ is transmitted, the control message which includes this system identification data is coupled by transceiver 32 to forward control channel message detector 40 whereat the system identification data is separated.

The received system identification data is coupled to comparator 42 whereat it is compared to the stored system identification data $SID_S$. The comparator, under the control of microprocessor 60, and as represented by inquiry 106, inquires if $SID_R=SID_S$. If so, comparator 42 activates driver 46 which sets status indicator 48 to provide a HOME indication, as represented by instruction 108. This indicates that mobile station 18 is disposed in its "home" system.

However, if inquiry 106 is answered in the negative, comparator 42 operates driver 46 to set status indicator 48 to provide a ROAM indication, as represented by instruction 110. This indicates that the mobile station is "visiting" a system that is served by a service provider to which the mobile station does not subscribe.

The foregoing has described conventional control over the HOME/ROAM indication. Reference now is made to the flow chart shown in FIG. 10 to describe one example of the manner in which the present invention is used. As before, it is assumed that mobile station 18 is in its idle mode. Thus, power has been supplied, as represented by instruction 102, and transceiver 32 is tuned to the forward control channel to scan the overhead message train received thereon. Base station 11 transmits this overhead message train, including the usual system identification data $SID_R$, on forward control channel 64. The overhead message train received by transceiver 32 is detected by forward control channel message detector 40 and, as represented by instruction 104, the system identification data is supplied to comparator 42.

The comparator carries out inquiry 106 to determine if $SID_R=SID_S$. If so, mobile station 18 is operating in its "home" system and driver 46 activates status indicator 48 to provide a HOME indication, as represented by instruction 108. In addition, registration message transmitter 58 supplies the usual registration message, including the mobile station identification data (MIN1, MIN2 and ESN), to transceiver 32 which transmits this registration message to base station 11 by way of reverse control channel 34. In this manner, mobile station 18 is registered on the cellular telephone system, as represented by instruction 112.

When mobile station 18 moves from its "home" system to the "visited" system, the received system identification data changes from $SID_R=SID_S$ to $SID_R \neq SID_S$, inquiry 106 is answered in the negative and inquiry 114 is answered in the affirmative. Comparator 42 energizes driver 46 to activate status indicator 48 to provide the ROAM indication, as represented by instruction 118. Thereafter, the mobile station identification data is transmitted from registration message transmitter 58 to transceiver 32 and over reverse control channel 34 to base station 11 and is detected by registration message detector 70 and analyzed by analyzer 72 which recognizes the mobile station as one that should be accorded "home" status. Accordingly, HOME/ROAM selector 7 selects the HOME indicator status order control message from message generator 76. This, in turn, results in the transmission of the HOME indicator status order control message to mobile station 18 by way of forward control channel message assembler 78, transceiver 62 and forward control channel 64. As a result, even though the ROAM indication initially was provided, the detection of the HOME indicator status order control message by message detector 50 overrides the ROAM indication, resulting in a HOME indication.

Now, when mobile station 18 next detects the overhead message train and $SID_R \neq SID_S$, inquiry 114 is answered in the negative and the activation of status indicator 48 is controlled by the indicator status order control message which may or may not be transmitted to transceiver 32.

In the present example, when the registration message is transmitted to base station 11, the mobile station identified thereby is recognized as being entitled to HOME status. Accordingly, indicator status order control message generator 76 generates the HOME indicator status order control message which is coupled to transceiver 62 by forward control channel message assembler 78 and transmitted to mobile station 18 over forward control channel 64.

On receipt of this HOME indicator status order control message, transceiver 32 couples this message to forward control channel message detector 40 which, in turn, supplies the HOME indicator status order control message to message detector 50. The detection of this message is represented by an affirmative answer to inquiry 116, and message detector 50 operates driver 46 to activate status indicator 48 so as to provide the HOME indication. Thus, even though $SID_R \neq SID_S$, receipt of the HOME indicator status order control message overrides what otherwise would have been a ROAM indication. Of course, if the indicator status order control message is a ROAM status order control message, status indicator 48 continues to provide a ROAM indication.

Figure 10:
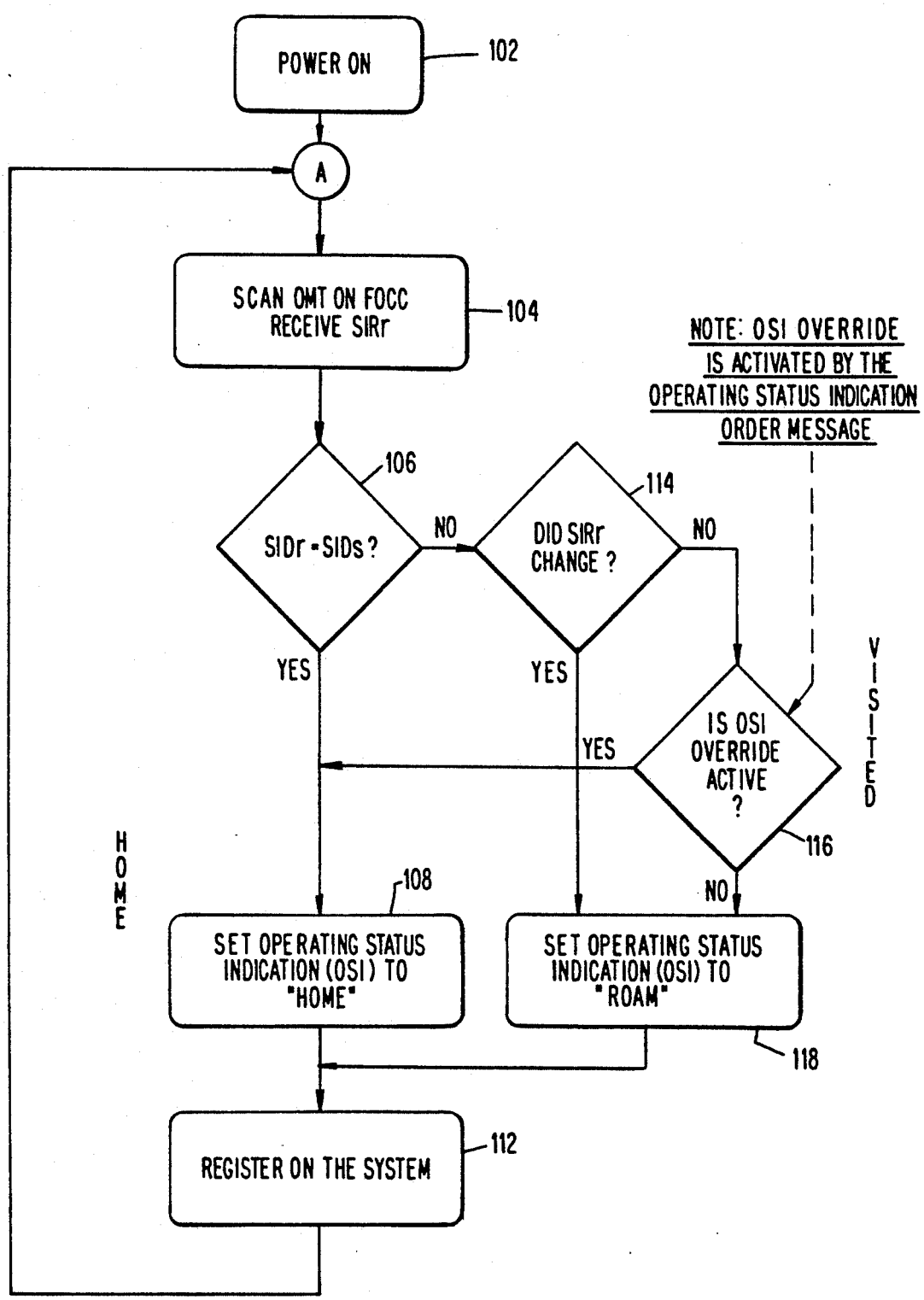

The foregoing operation, as represented by the flow chart of FIG. 10, is repeated periodically for as long as mobile station 18 remains idle. Once the mobile station enters its active mode so as to engage in voice communication with base station 11, the operation represented by the flow chart shown in FIG. 11 is carried out. Assuming that mobile station 18 crosses border zone 30 from cell X1 to cell Y5 while in voice communication with base station 11, it is recognized that status indicator 48 provides the HOME indication because $SID_R = SID_S$. As the border zone is crossed, the conventional handoff operation is carried out and transceiver 32 is tuned the control and voice channels used by base station 25, as represented by instruction 130. Thus, voice communication continues, but over the forward and reverse channels associated with base station 25.

As part of the handoff procedure, the mobile station identification data that had been transmitted to base station 11 from mobile station 18 and then coupled to MTSO 10 now is transferred to MTSO 20 and coupled to base station 25 whereat it is analyzed to determine if this mobile station is entitled to preferential status. Let it be assumed that, because of the arrangement between the service providers for systems X and Y, the mobile station is to be treated as a "home" station while in cell Y5. Accordingly, HOME/ROAM selector 74 at base station 25 selects the HOME message to be generated by message generator 76; and this HOME message is assembled in forward voice channel message assembler 80 and transmitted to mobile station 18 by transceiver 62 over forward voice channel 66. Receipt of this HOME indicator status order control message by transceiver 32 is coupled by way of forward voice channel detector 52 and message separator 54 to indicator status order control message detector 50. Here, the HOME indicator status order control message is detected, resulting in an affirmative answer to inquiry 132 of the flow chart shown in FIG. 11. Consequently, driver 46 is energized to activate status indicator 48 to provide a HOME indication, as represented by instruction 136.

Voice communication between mobile station 18 and base station 25 continues, as represented by a negative answer to inquiry 138. Then, until a ROAM status order control message is received by the mobile station, the HOME indication remains and the telephone call continues, as represented by the loop comprised of inquiry 132, instruction 136 and inquiry 138 of FIG. 11. Of course, when the telephone call is completed, the release operation is carried out, as represented by an affirmative answer to inquiry 138, whereupon the routine carried out by microprocessor 60 returns to point A in FIG. 10. That is, the mobile station returns to its idle mode and monitors the overhead message train on the forward control channel transmitted thereto by base station 25.

Let it be assumed that, while in its active mode, mobile station 18 crosses from cell Y5 into cell Y1. Let it be further assumed that this mobile station is not entitled to preferential status in cell Y1. Accordingly, and as shown by the flow chart of FIG. 11, the usual handoff operation is carried out such that mobile station 18 now is tuned to the control and voice channels used by base station 21. As part of this handoff procedure, the mobile station identification data is analyzed by the base station from which it is determined that mobile station 18 is "visiting" cell Y1 and is to be assigned ROAM status. Hence, HOME/ROAM selector 74 selects the ROAM indicator status order control message to be generated by message generator 76; and as before, this message is assembled in forward voice channel message assembler 80 and transmitted to the mobile station 18 by transceiver 62 over forward voice channel 66.

At the mobile station, the ROAM indicator status order control message is coupled from transceiver 32 to message separator 54 by way of forward voice channel detector 52. The separated indicator status order control message is detected by message detector 50 as a ROAM message. Thus, inquiry 132 is answered in the negative. As a result, message detector 50 energizes driver 46 to activate status indicator 48 to provide the ROAM indication, as represented by instruction 134.

Figure 11:
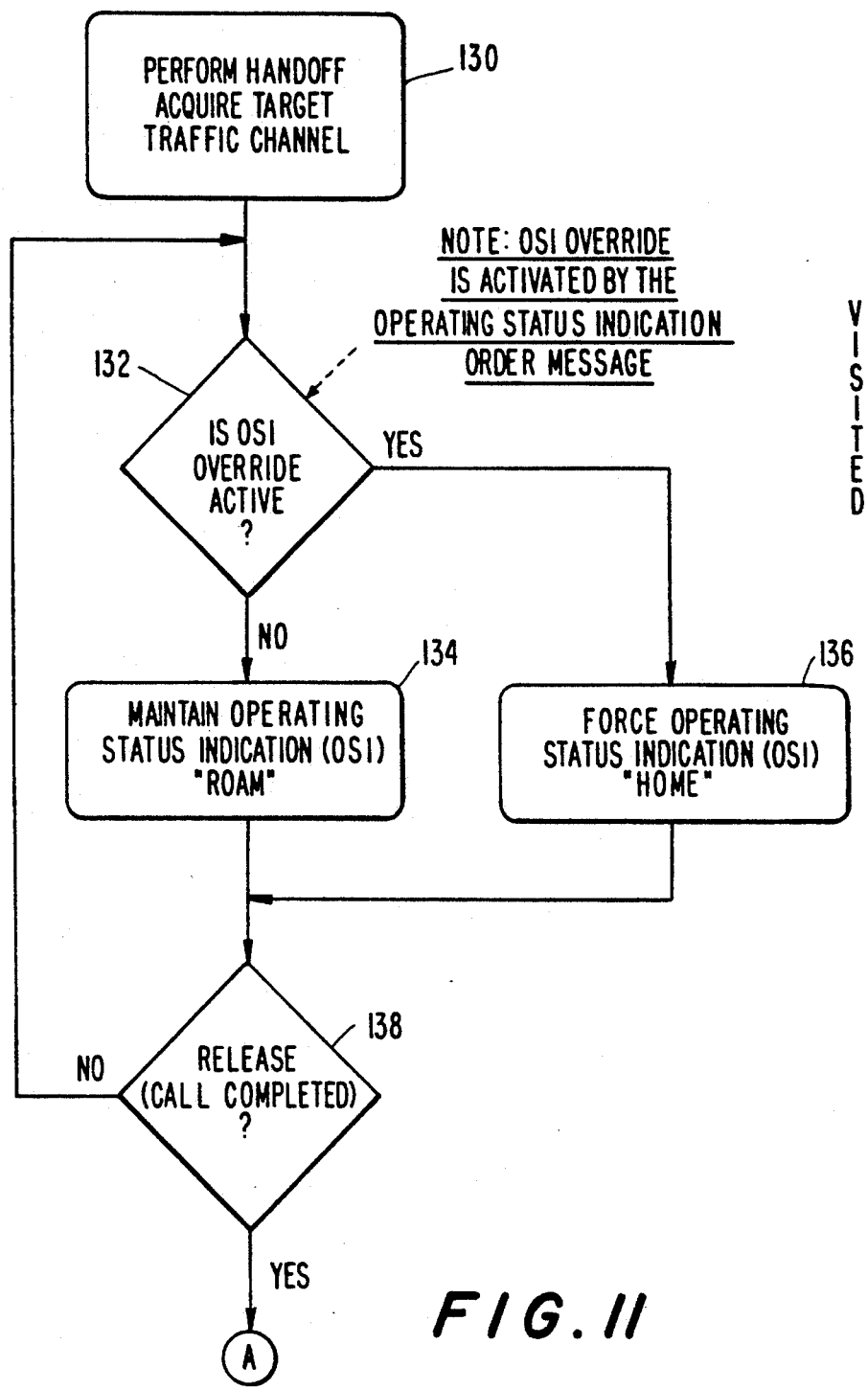

As mobile station 18 remains in its active state and "roams" within system Y, the operation represented by the flow chart shown in FIG. 11 is repeated. Of course, and as described above, when the telephone call is completed, the usual release operation is executed and the mobile station returns to its idle mode to operate in accordance with the flow chart shown in FIG. 10.

It will be appreciated that the activation of status indicator 48 following a HANDOFF operation, as shown by the flow chart of FIG. 11, provides a ROAM indication when the mobile station, while in its active mode, roams into a cell of system Y within which it is not entitled to preferential status. Likewise, the flow chart of FIG. 11 represents the activation of status indicator 48 to provide a HOME indication when the mobile station "roams" into a cell of system Y within which it is entitled to preferential status or, alternatively, when the mobile station returns to its "home" system X.

Although not specifically described in the foregoing, it is appreciated that if the cellular mobile telephone system is a digital system including digital traffic channels, then the transmission of indicator status order control messages are transmitted from the base station transceiver 62 over forward digital traffic channel 68 and detected at mobile station 18 by forward digital traffic channel detector 56 from which they are coupled to indicator status order control message detector 50 by message separator 54. Likewise, the mobile station identification data included in the registration message produced by registration message transmitter 58 is returned to the base station by transmission from transceiver 32 over reverse digital traffic channel 38. Thus, the present invention is readily adapted for use in either an analog or digital cellular mobile telephone system.

While the present invention has been particularly shown and described with reference to a preferred embodiment, it will be readily appreciated by those of ordinary skill in the art that various changes may be made without departing from the spirit and scope of the invention. The indicator status order control message may be added to the usual control messages transmitted to a mobile station during idle and active modes. It is intended that the appended claims be interpreted as covering the specific embodiment described, those changes which have been discussed or suggested above, as well as all equivalents thereto.

What is claimed is:

1. Apparatus for use in a cellular mobile telephone system wherein voice and data signals are communicated between a mobile station and a base station, said mobile station being a subscriber to a home system, said mobile station being provided with a status indicator to indicate if the base station with which said mobile station is communicating is included in said home system and said mobile station having stored therein system identification data identifying said home station, said mobile station being operable in an idle mode, wherein the mobile station receives control messages including system identification data and transmits control messages including mobile station identification data, and said mobile station being operable in an active mode to transmit and receive voice signals, said apparatus comprising system ID detecting means at said mobile station for detecting if the system identification data received in a control message identifies said home system, status activating means for activating said status indicator in response to said system ID detecting means, status order control message sensing means for sensing receipt of an indicator status order control message, override means responsive to the sensed indicator status order control message for selectively activating or deactivating said status indicator as determined by said indicator status order control message notwithstanding said system ID detecting means, and indicator status order control message transmit means at said base station for selectively transmitting said indicator status order control message to said mobile station.

2. The apparatus of claim 1 wherein said base station includes a forward control channel for communicating with an idle mobile station to transmit idle mode control message to said idle mobile station, said idle mode control messages including said indicator status order control message.

3. The apparatus of claim 2 wherein said base station includes a forward voice channel for communicating with an active mobile station to transmit voice signals and active mode control messages to said active mobile station, said active mode control messages including said indicator status order control message.

4. The apparatus of claim 1 wherein said base station includes indicator status order control message generating means for selectively generating a HOME message representing subscriber status, and said override means is responsive to said HOME message for deactivating said status indicator.

5. The apparatus of claim 4 wherein said indicator status order control message generating means is selectively operable to generate a ROAM message representing non-subscriber status, and said override means is responsive to said ROAM message for activating said status indicator.

6. The apparatus of claim 5 wherein said base station includes mobile station identification data analyzing means for analyzing the mobile station identification data transmitted by said mobile station to determine the subscriber status of said mobile station and to control said indicator status order control message generating means accordingly.

7. The apparatus of claim 5 wherein the cellular mobile telephone system includes at least one other base station for communicating with said mobile station when said mobile station moves from a first service area serviced by the first-mentioned base station to a second service area serviced by said other base station; said first base station including HANDOFF message generating means for generating a HANDOFF message included in said active mode control messages transmitted to the active mobile station when said active mobile station moves from said first service area to said second service area to command said mobile station to communicate with said other base station; and said other base station includes mobile station identification data analyzing means for analyzing the mobile station identification data originating from said mobile station to transmit an indicator status order control message to said mobile station as a function of said mobile station identification data.

8. The apparatus of claim 1 wherein said base station includes a forward digital traffic channel for communicating with a mobile station to transmit control messages including said indicator status order control message.

9. The apparatus of claim 8 wherein said mobile station includes a reverse digital traffic channel for transmitting mobile station identification data to a base station.

10. In a cellular mobile telephone system wherein several mobile stations move into and through service cells that are serviced by respective base stations, and wherein adjacent cells are serviceable by different service providers such that a mobile station located in a first service cell that is serviced by a service provider to which the mobile station subscribes is a HOME mobile station and said mobile station is a ROAMING mobile station when it moves into a service cell that is serviced by a service provider to which said mobile station does not subscribe, the method of indicating whether the mobile station is a HOME or ROAMING mobile station comprising the steps of transmitting from the base station serving the service cell in which said mobile station is located to said mobile station a system identification code representing the service provider for that service cell; determining if said mobile station is a HOME or ROAMING mobile station as a function of the transmitted system identification code; returning from said mobile station to the serving base station a mobile station identification code representing the identity of said mobile station; selectively transmitting from said serving base station to said mobile station a status indicator message representing that said mobile station is a HOME or ROAMING mobile station notwithstanding a determination made as a function of the transmitted system identification code; and indicating at said mobile station the HOME/ROAM status of said mobile station as represented by said status indicator message.

11. The method of claim 10 wherein said mobile station is operable in an idle mode to register with said serving base station by returning said mobile station identification code and is operable in an active mode to communicate voice information with said serving base station; and said serving base station is operable to transmit said system identification code only to an idle mobile station and to transmit said status indicator message to an idle or active mobile station.

12. The method of claim 11 wherein said mobile station in idle mode moves from a first service cell in which said mobile station is a HOME mobile station to a second service cell in which said mobile station is a ROAMING mobile station; wherein the base station serving said second service cell transmits a system identification code from which said mobile station is determined to be a ROAMING mobile station; and wherein said ROAMING mobile station returns to said base station serving said second service cell the mobile station identification code of said ROAMING mobile station; and said step of transmitting a status indicator message comprises sensing if said ROAMING mobile station has been assigned HOME status, and transmitting from said base station serving said second service cell to said ROAMING mobile station a HOME status indicator message; and said step of indicating comprises overriding a ROAM determination at said mobile station to thereby indicate HOME status.

13. The method of claim 11 wherein said mobile station in active mode moves from a first service cell in which said mobile station is a HOME mobile station to a second service cell in which said mobile station is a ROAMING mobile station; and further comprising the steps of handing off said mobile station from said first service cell to said second service cell, sensing at the base station serving said second service cell if the mobile station identified by the returned mobile station identification code has been assigned HOME status, and transmitting to said mobile station from said base station serving said second service cell a status indicator message as a function of said sensing.

14. The method of claim 13 wherein said step of indicating comprises activating a ROAM indication at the active mobile station when said status indicator message is a ROAM status indicator message.

15. The method of claim 11 wherein said mobile station in active mode moves from a first service cell in which said mobile station is a ROAMING mobile station to a second service cell in which said mobile station is a HOME mobile station; and further comprising the steps of handing off said mobile station from said first service cell to said second service cell, sensing at the base station serving said second service cell that the mobile station identified by the returned mobile station identification code is a HOME mobile station, and transmitting to said mobile station from said base station serving said second service cell a HOME status indicator message as a function of said sensing.

16. Apparatus for indicating whether a cellular telephone mobile station is a HOME or ROAMING mobile station as it moves into and through service cells that are serviced by different base stations, and wherein adjacent cells are serviceable by different service providers whereby said mobile station is a HOME mobile station when located in a service cell that is serviced by a service provider to which the mobile station subscribes and said mobile station is a ROAMING mobile station when located in a service cell that is serviced by a service provider to which the mobile station does not subscribe, said apparatus comprising: system ID detecting means for detecting system identification data transmitted by a base station and for determining if said system identification data identifies the service provider to which the mobile station subscribes; status indicating means responsive to said system ID detecting means for providing a HOME indication if said system identification data identifies the service provider to which the mobile station subscribes and for providing a ROAMING indication if said system identification data identifies a service provider to which the mobile station does not subscribe; status order control message sensing means for sensing receipt from said base station of an indicator status order control message which represents that said mobile station is a HOME or ROAMING mobile station notwithstanding a determination made by said system ID detecting means; and override means responsive to the received indicator status order control message for selectively overriding the indication provided by said status indicating means.

17. The apparatus of claim 16 wherein said mobile station is operable in an idle mode to receive said system identification data and includes station ID transmit means to transmit mobile station identification data in said idle mode.

18. The apparatus of claim 17 wherein said mobile station further includes forward control channel message detecting means operable in said idle mode to receive system identification data and said indicator status order control message over a forward control channel.

19. The apparatus of claim 18 wherein said mobile station additionally includes forward voice channel message detecting means operable in an active mode to receive said indicator status order control message over a forward voice channel, said forward voice channel being further operable to receive voice signals from said base station.

20. The apparatus of claim 16 wherein said mobile station further includes forward digital traffic channel message detecting means operable to detect said indicator status order control message received over a forward digital traffic channel.

21. The apparatus of claim 16 wherein said override means is responsive to a received HOME status order control message for causing said status indicating means to provide a HOME indication even if said system identification data identifies a service provider to which the mobile station does not subscribe.

22. The apparatus of claim 16 wherein said mobile station is operable in an active mode to communicate voice signals with a base station; and wherein said mobile station when in said active mode moves from a service cell in which the mobile station is a HOME mobile station to a service cell in which said mobile station is a ROAMING mobile station; and wherein said override means is responsive to a received ROAMING status order control message for causing said status indicating means to provide a ROAMING indication even if system identification data is not received by the active mobile station. WSF64.3

* * * * *